US010946789B2

(12) United States Patent
Herman et al.

(10) Patent No.: US 10,946,789 B2
(45) Date of Patent: Mar. 16, 2021

(54) VEHICLE LAMP-CLEANING SYSTEM

(71) Applicant: Ford Global Technologies, LLC, Dearborn, MI (US)

(72) Inventors: David Michael Herman, Oak Park, MI (US); Ashwin Arunmozhi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/904,749

(22) Filed: Jun. 18, 2020

(65) Prior Publication Data

US 2020/0324689 A1 Oct. 15, 2020

Related U.S. Application Data

(62) Division of application No. 16/268,591, filed on Feb. 6, 2019.

(51) Int. Cl.
*B60Q 1/00* (2006.01)
*B60Q 11/00* (2006.01)
*B60Q 1/14* (2006.01)

(52) U.S. Cl.
CPC ......... *B60Q 1/1423* (2013.01); *B60Q 1/0005* (2013.01); *B60Q 1/0041* (2013.01); *B60Q 11/005* (2013.01)

(58) Field of Classification Search
None
See application file for complete search history.

(56) References Cited

U.S. PATENT DOCUMENTS

| 5,923,125 | A | 7/1999 | Endo |
| 9,773,304 | B2 | 9/2017 | Mayumi |
| 2014/0246975 | A1* | 9/2014 | Futamura ............. B60Q 1/0023 315/82 |
| 2015/0359067 | A1* | 12/2015 | Kurita ............... G02F 1/133603 315/151 |

(Continued)

FOREIGN PATENT DOCUMENTS

| CN | 204044340 U | 12/2014 |
| DE | 102008025530 B4 | 11/2012 |
| JP | 20106249 A | 1/2010 |

OTHER PUBLICATIONS

Basri et al., "Photometric Stereo with General, Unknown Lighting", International Journal of Computer Vision, May 2007 DOI: 10.1109/CVPR.2001.990985 • Source: DBLP.

(Continued)

*Primary Examiner* — Dedei K Hammond
(74) *Attorney, Agent, or Firm* — Frank A. MacKenzie; Bejin Bieneman PLC

(57) ABSTRACT

A system includes at least one sensor; a plurality of lamps fixed relative to the sensor; at least one vehicle component attached to the lamps; and a computer communicatively coupled to the lamps, the at least one sensor, and the at least one vehicle component. The computer is programmed to sequentially activate the lamps, determine that an intensity for at least one of the lamps is below a respective intensity threshold based on data from the sensor during the sequential activations of the lamps, and actuate the at least one vehicle component in response to one of the intensities being below the respective intensity threshold.

19 Claims, 4 Drawing Sheets

(56) References Cited

U.S. PATENT DOCUMENTS

| | | |
|---|---|---|
| 2016/0210754 A1 | 7/2016 | Ida et al. |
| 2017/0132801 A1 | 5/2017 | Trenholm et al. |
| 2017/0305344 A1 | 10/2017 | Okumichi et al. |
| 2018/0339681 A1 | 11/2018 | Salter et al. |
| 2019/0156485 A1* | 5/2019 | Pfeiffer ................ G05D 1/0253 |

OTHER PUBLICATIONS

Cho et al., "Photometric Stereo under Non-uniform Light—Intensities and Exposures", ECCV'16 (Europen Conference on Computer Vision).

Hold-Geoffroy et al., "Deep Photometric Stereo on a Sunny Day", arXiv:1803.10850v2, May 10, 2018.

Hung et al., "Photometric Stereo in the Wild", 2015 IEEE Winter Conference on Applications of Computer Vision (WACV) (2015), http://doi.ieeecomputersociety.org/10.1109/WACV.2015.47, https://www.computer.org/csdl/proceedings/wacv/2015/6683/00/6683a302-abs.html.

Inose et al., "Refining Outdoor Photometric Stereo Based on Sky Model", Information and Media Technologies, 8(4), 2013.

Jian et al., "Comprehensive assessment of non-uniform illumination for 3D heightmap reconstruction in outdoor environments", Computers in Industry, vol. 99, Aug. 2018, https://www.sciencedirect.com/science/article/pii/S016636151730619X.

Kozera et al., "Orthogonal Illuminations in Two Light-Source Photometric Stereo", CISIM 2016, Computer Information Systems and Industrial Management, https://link.springer.com/chapter/10.1007/978-3-319-45378-1_36.

Wang et al., "Photometric Stereo with Small Angular Variations", 2015 IEEE International Conference, https://ieeexplore.ieee.org/document/7410754.

Yu et al., "PVNN: A neural network library for photometric vision", Computer Vision Foundation, 2017 IEEE International Conference on Computer Vision.

Yu et al., "Outdoor Photometric Stereo", 2013, www.saikit.org/projects/envPS/envPS_LowRes.pdf.

Wehrwein, "CS4670/5760: Computer Vision", Lecture 23, www.cs.cornell.edu/courses/cs4670/2015sp/lectures/lec23_photo . . . .

\* cited by examiner

VEHICLE LAMP-CLEANING SYSTEM

CROSS-REFERENCE TO RELATED APPLICATION

This patent application is a divisional application of, and as such claims priority to, U.S. patent application Ser. No. 16/268,591, filed on Feb. 6, 2019, which is hereby incorporated by reference in its entirety.

BACKGROUND

Vehicles include lamps for illuminating the environment through which the vehicle is traveling and for signaling turning, braking, etc. to other vehicles. Types of lamps include light-emitting diode (LED), tungsten, halogen, high-intensity discharge (HID) such as xenon, laser, etc.

During the course of operation, the lamps can experience a reduced intensity. Causes of reduced intensity can include the lamp becoming dirty or obscured.

DETAILED DESCRIPTION

Figure 1:
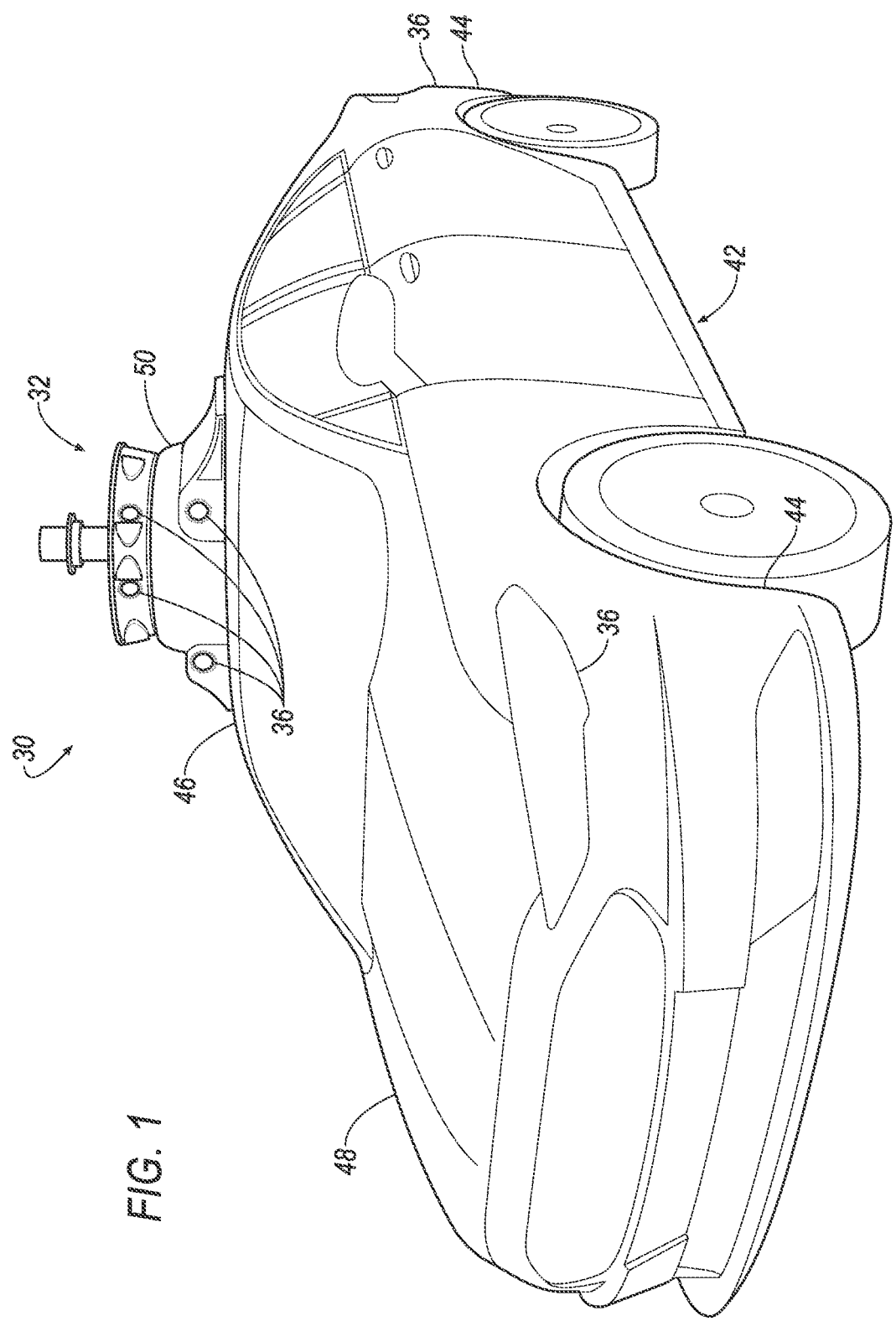
FIG. 1 is a perspective view of an example vehicle.

The system described below can keep lamps of a vehicle at close to full intensity and can do so efficiently. The system can detect that a particular lamp has a reduced intensity and can compensate by increasing how much power is supplied to that lamp and by cleaning that lamp. Being able to detect which lamp has a reduced intensity is an advantage compared to systems using an aggregate or overall intensity of a scene, which can find it more difficult to discriminate between the effects of different lamps. The system can efficiently use cleaning resources by cleaning only the lamp that has reduced intensity.

The system includes at least one sensor; a plurality of lamps fixed relative to the sensor; at least one vehicle component attached to the lamps; and a computer communicatively coupled to the lamps, the at least one sensor, and the at least one vehicle component. The computer is programmed to sequentially activate the lamps, determine that an intensity for at least one of the lamps is below a respective intensity threshold based on data from the sensor during the sequential activations of the lamps, and actuate the at least one vehicle component in response to one of the intensities being below the respective intensity threshold.

The at least one vehicle component may be at least one cleaning system positioned to clean the lamps. The computer may be further programmed to actuate the at least one cleaning system to clean the lamps that have intensities below the respective intensity thresholds.

Actuating the vehicle component may include increasing a voltage to the lamps that have intensities below the respective intensity thresholds.

The system may further include a body panel fixed in a field of view of the sensor.

Each lamp may define a cone of illumination, and the sensor may be outside the cones of illumination.

A computer includes a processor and a memory storing instructions executable by the processor to sequentially activate a plurality of lamps fixed relative to each other, determine that an intensity for at least one of the lamps is below a respective intensity threshold based on data from a sensor during the sequential activations of the lamps, and actuate a vehicle component in response to one of the intensities being below the respective intensity threshold.

Actuating the vehicle component may be actuating at least one cleaning system to clean the lamps that have intensities below the respective intensity thresholds.

Actuating the vehicle component may be increasing a voltage to the lamps that have intensities below the respective intensity thresholds.

The instructions may further include to determine surface normals from the data from the sensor during the sequential activations of the lamps, and determine the respective intensities for the lamps based on the surface normals and on the data from the sensor during the sequential activations of the lamps.

The instructions may further include to determine positions of ambient light sources from the data from the sensor during the sequential activations of the lamps, and determine the respective intensities for the lamps based on the positions of the ambient light sources and on the data from the sensor during the sequential activations of the lamps. The sensor data may include data of a body panel during each activation of one of the lamps, and determining positions of ambient light sources may be based on the data of the body panel.

A method includes sequentially activating a plurality of lamps fixed relative to each other, determining that an intensity for at least one of the lamps is below a respective intensity threshold based on data from a sensor during the sequential activations of the lamps, and actuating a vehicle component in response to one of the intensities being below the respective intensity threshold.

Actuating the vehicle component may be actuating at least one cleaning system to clean the lamps that have intensities below the respective intensity thresholds.

Actuating the vehicle component may be increasing a voltage to the lamps that have intensities below the respective intensity thresholds.

The method may further include determining surface normals from the data from the sensor during the sequential activations of the lamps, and determining the respective intensities for the lamps based on the surface normals and on the data from the sensor during the sequential activations of the lamps.

The method may further include determining positions of ambient light sources from the data from the sensor during the sequential activations of the lamps, and determining the respective intensities for the lamps based on the positions of the ambient light sources and on the data from the sensor during the sequential activations of the lamps. The sensor data may include data of a body panel during each activation of one of the lamps, and determining positions of ambient light sources may be based on the data of the body panel.

A system 32 for a vehicle 30 includes at least one sensor 34; a plurality of lamps 36 fixed relative to the sensor 34; at least one vehicle component 38 attached to the lamps 36; and a computer 40 communicatively coupled to the lamps 36, the at least one sensor 34, and the at least one vehicle component 38. The computer 40 is programmed to sequentially activate the lamps 36, determine that an intensity for at least one of the lamps 36 is below a respective intensity threshold based on data from the sensor 34 during the sequential activations of the lamps 36, and actuate the at least one vehicle component 38 in response to one of the intensities being below the respective intensity threshold.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a body 42. The vehicle 30 may be of a unibody construction, in which a frame and the body 42 of the vehicle 30 are a single component. The vehicle 30 may, alternatively, be of a body-on-frame construction, in which the frame supports the body 42 that is a separate component from the frame. The frame and the body 42 may be formed of any suitable material, for example, steel, aluminum, polymer matrix carbon fiber composite, magnesium, etc. The body 42 includes body panels 44, 46, 48 partially defining an exterior of the vehicle 30. The body panels 44, 46, 48 may present a class-A surface, e.g., a finished surface exposed to view by a customer and free of unaesthetic blemishes and defects. The body panels 44, 46, 48 include, e.g., a roof 46, a hood 48, etc.

Figure 2:
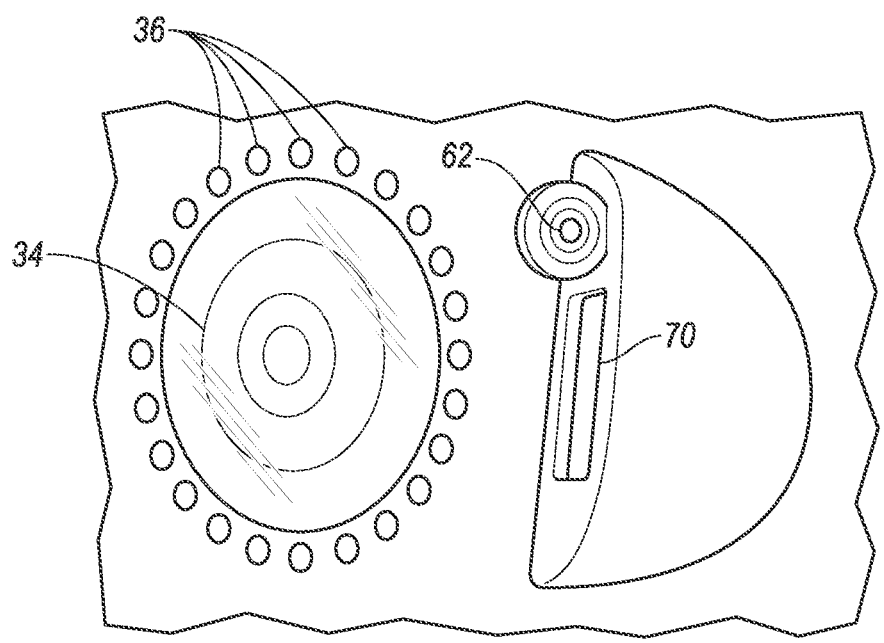
FIG. 2 is a perspective view of a sensor in a housing of the vehicle.

With reference to FIG. 2, the sensors 34 can be cameras and can detect electromagnetic radiation in some range of wavelengths. For example, the sensors 34 may detect visible light, infrared radiation, ultraviolet light, or some range of wavelengths including visible, infrared, and/or ultraviolet light. For another example, the sensors 34 may be a time-of-flight (TOF) cameras, which include a modulated light source for illuminating the environment and detect both reflected light from the modulated light source and ambient light to sense reflectivity amplitudes and distances to the scene.

The sensors 34 are mounted on the vehicle 30, directly or indirectly. For example, the sensors 34 can be mounted on one of the body panels 44, 46, 48, e.g., the roof 46. For another example, the sensors 34 can be mounted to a housing 50, e.g., mounted inside the housing 50, and the housing 50 can be mounted on one of the body panels 44, 46, 48, e.g., the roof 46, as shown in FIG. 1. The sensors 34 can be fixed so that at least one of the body panels 44, 46, 48, e.g., the roof 46 or the hood 48, is in the fields of view of the sensors 34.

The lamps 36 may be any lighting apparatuses suitable for shining at the environment, e.g., light-emitting diode (LED), tungsten, halogen, high-intensity discharge (HID) such as xenon, laser, vertical-cavity surface-emitting laser (VCSEL), etc. For example, the lamps 36 can be near-infrared (NIR) lamps positioned near the sensors 34 to illuminate the environment at night for the sensors 34. For another example, the lamps 36 can be headlights, taillights, etc.

The lamps 36 are fixed relative to the sensors 34 and fixed relative to each other. Each lamp 36 defines a cone of illumination, and the sensors 34 are outside the cones of illumination. In other words, the lamps 36 do not shine at the sensors 34. In the example of NIR lamps, the lamps 36 can be positioned encircling one of the sensors 34 and aimed in the same direction as that sensor 34. The cones of illumination of the lamps 36 can encompass one of the body panels 44, 46, 48, e.g., the roof 46 or the hood 48, that is in the field of view of one of the sensors 34. Alternatively or additionally, the lamps 36, e.g., headlights, taillights, etc., can be arranged in a way that does not shine at one of the body panels 44, 46, 48.

The lamps 36 are spaced from each other. The number of lamps 36 is at least three. A number of lamps 36 above three allows redundancy in the photometric-stereo calculations described below, which increases the robustness of the results of those calculations.

Figure 3:
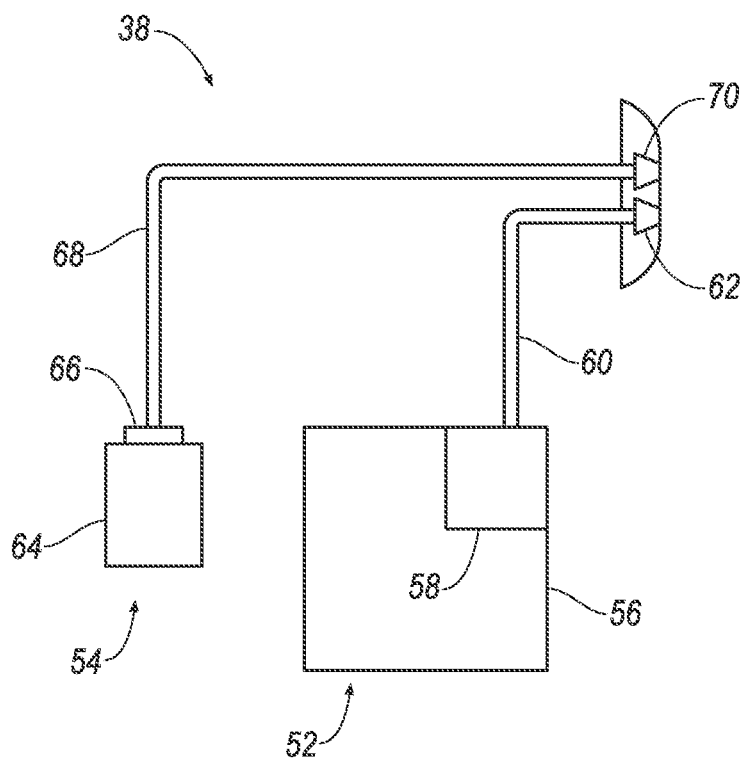
FIG. 3 is a diagram of an example cleaning system for the sensor.

With reference to FIG. 3, the vehicle component 38 can include a liquid cleaning system 52 and an air cleaning system 54, each positioned to clean the lamps 36.

The liquid cleaning system 52 of the vehicle 30 includes a reservoir 56, a pump 58, liquid supply lines 60, and the liquid nozzles 62. The reservoir 56, the pump 58, and the liquid nozzles 62 are fluidly connected to each other (i.e., fluid can flow from one to the other). The liquid cleaning system 52 distributes washer fluid stored in the reservoir 56 to the liquid nozzles 62. "Washer fluid" herein refers to any liquid stored in the reservoir 56 for cleaning. The washer fluid may include solvents, detergents, surfactants, diluents such as water, etc.

The reservoir 56 may be a tank fillable with liquid, e.g., washer fluid for window cleaning. The reservoir 56 may be disposed in a front of the vehicle 30, specifically, in an engine compartment forward of a passenger cabin. The reservoir 56 may store the washer fluid only for supplying the lamps 36 or also for other purposes, such as supply to the sensors 34 or the windshield or as a coolant.

The pump 58 may force the washer fluid through the liquid supply lines 60 to the liquid nozzles 62 with sufficient pressure that the washer fluid sprays from the liquid nozzles 62. The pump 58 is fluidly connected to the reservoir 56. The pump 58 may be attached to or disposed in the reservoir 56.

The liquid supply lines 60 extend from the pump 58 to the liquid nozzles 62. The liquid supply lines 60 may be, e.g., flexible tubes.

The liquid nozzles 62 receive washer fluid from the liquid supply lines 60. The liquid nozzles 62 are positioned to eject the washer fluid at the lamps 36 or a subset of the lamps 36. The liquid nozzles 62 are shaped to eject the washer fluid at a high pressure and speed.

The air cleaning system 54 includes a compressor 64, a filter 66, air supply lines 68, and the air nozzles 70. The compressor 64, the filter 66, and the air nozzles 70 are fluidly connected to each other (i.e., fluid can flow from one to the other) in sequence through the air supply lines 68.

The compressor 64 increases the pressure of a gas by forcing additional gas from a lower-pressure region to a higher-pressure region. The compressor 64 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 66 removes solid particulates such as dust, pollen, mold, dust, and bacteria from air flowing through the filter 66. The filter 66 may be any suitable type of filter, e.g., paper, foam, cotton, stainless steel, oil bath, etc.

The air supply lines 68 extend from the compressor 64 to the filter 66 and from the filter 66 to the air nozzles 70. The air supply lines 68 may be, e.g., flexible tubes.

The air nozzles 70 receive air from the air supply lines 68. The air nozzles 70 are positioned to eject the air at the lamps 36 or at a subset of the lamps 36. The air nozzles 70 are shaped to eject the air at a high pressure and speed.

Figure 4:
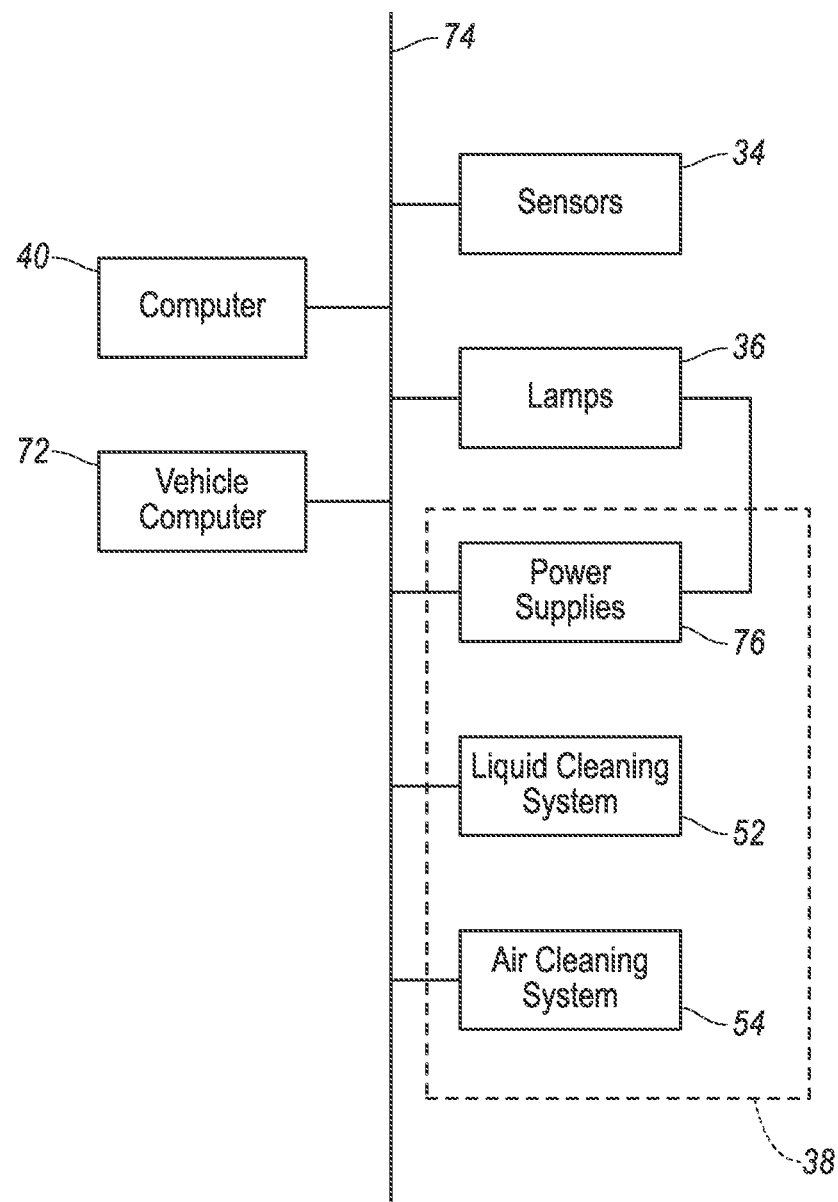
FIG. 4 is a block diagram of an example control system for a lighting system.

With reference to FIG. 4, the vehicle 30 may be an autonomous vehicle. A vehicle computer 72 can be programmed to operate the vehicle 30 independently of the intervention of a human driver, completely or to a lesser degree. The vehicle computer 72 may be programmed to operate the propulsion, brake system, steering, and/or other vehicle systems based on data received from, e.g., the sensors 34. For the purposes of this disclosure, autonomous operation means the vehicle computer 72 controls the propulsion, brake system, and steering without input from a human driver; semi-autonomous operation means the vehicle computer 72 controls one or two of the propulsion, brake system, and steering and a human driver controls the remainder; and nonautonomous operation means a human driver controls the propulsion, brake system, and steering.

The vehicle computer 72 is a microprocessor-based computer. The vehicle computer 72 includes a processor, memory, etc. The memory of the vehicle computer 72 includes memory for storing instructions executable by the processor as well as for electronically storing data and/or databases.

The computer 40 is one or more microprocessor-based computers. The computer 40 includes memory, at least one processor, etc. The memory of the computer 40 includes memory for storing instructions executable by the processor as well as for electronically storing data and/or databases. The computer 40 may be the same computer as the vehicle computer 72, or the computer 40 may be one or more separate computers in communication with the vehicle computer 72 via a communications network 74, or the computer 40 may encompass multiple computers including the vehicle computer 72. As a separate computer, the computer 40 may be or include, e.g., one or more electronic control units or modules (ECUs or ECMs).

The computer 40 may transmit and receive data through the communications network 74, which may be a controller area network (CAN) bus, Ethernet, WiFi, Local Interconnect Network (LIN), onboard diagnostics connector (OBD-II), and/or by any other wired or wireless communications network. The computer 40 may be communicatively coupled to the vehicle computer 72, the sensors 34, the lamps 36, the vehicle component 38, and other components via the communications network 74.

The vehicle component 38 can include power supplies 76 electrically coupled to the lamps 36. The power supplies 76 can be any type of power supply suitable for providing high-voltage electricity for operating the vehicle 30, e.g., a battery such as lithium-ion, lead-acid, etc.; a capacitor; etc. The power supplies 76 can supply a selectable voltage to loads such as respective lamps 36. The selectable voltage can be supplied to each lamp 36 separately.

Figure 5:
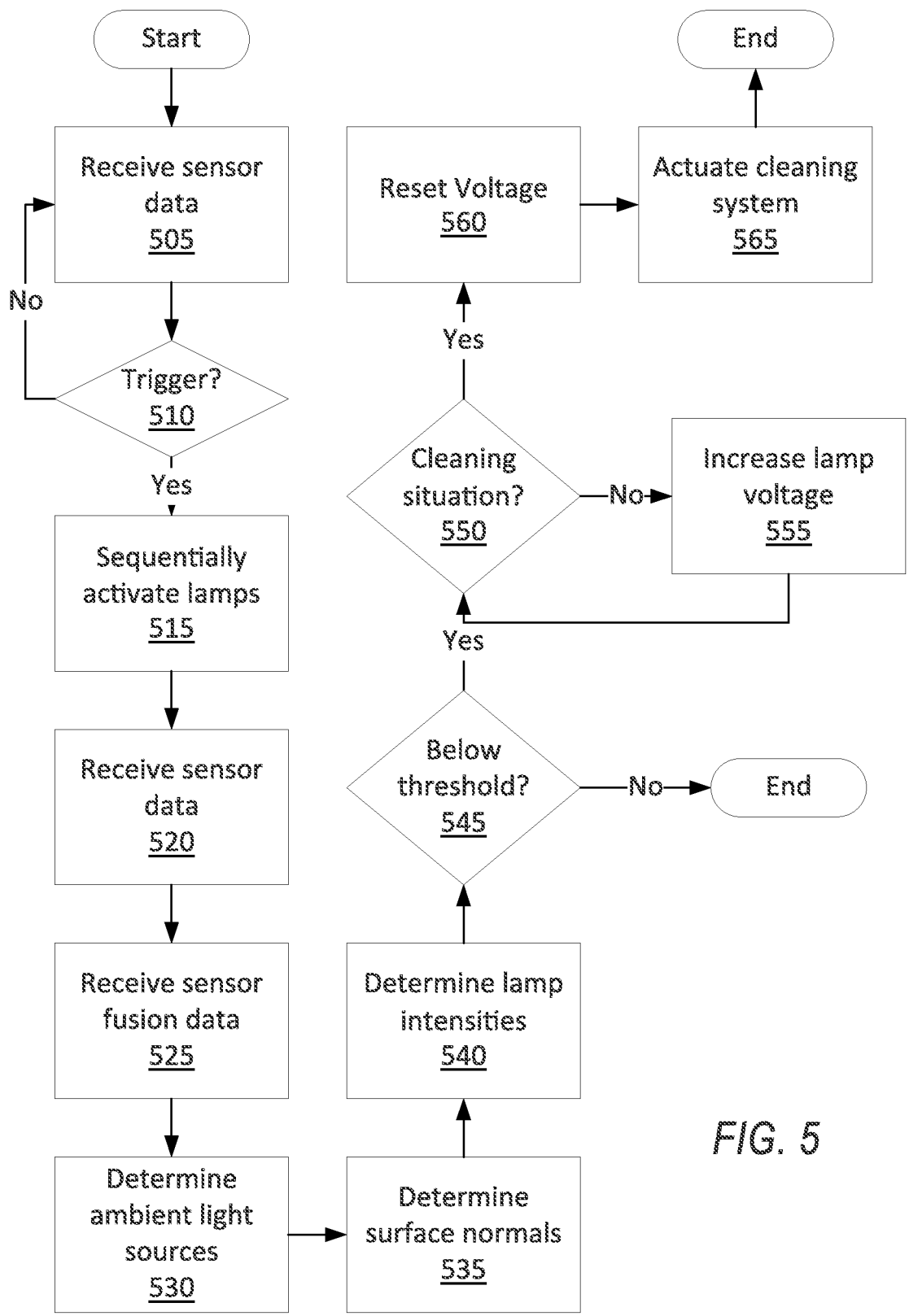
FIG. 5 is a process flow diagram of an example process for controlling the lighting system.

FIG. 5 is a process flow diagram illustrating an exemplary process 500 for controlling intensities of the lamps 36. The memory of the computer 40 stores executable instructions for performing the steps of the process 500. As a general overview of the process 500, in response to a trigger, the computer 40 sequentially activates the lamps 36, determines the respective intensities of the lamps 36 according to photometric-stereo analysis, and actuates the vehicle component 38 in response to one of the intensities being below a respective intensity threshold for the respective lamp 36. Depending on the cleaning situation, the vehicle component 38 that the computer 40 actuates can be the power supplies 76 for the lamps 36 and/or the liquid cleaning system 52 and air cleaning system 54.

The process 500 begins in a block 505, in which the computer 40 receives data from the sensors 34 through the communications network 74. The data are a sequence of image frames of the fields of view of the respective sensors 34. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor 34 at the time that the image frame was recorded, can be specified in pixel dimensions or coordinates, e.g., an ordered pair of pixel distances, such as a number of pixels from a top edge and a number of pixels from a left edge of the field of view.

Next, in a decision block 510, the computer 40 determines whether a trigger for performing the rest of the process 500 has occurred. The trigger can indicate that at least one of the lamps 36 may have a reduced intensity. For example, the computer 40 may determine that one of the sensors 34 is obscured based on data from that sensor 34, which suggests that the lamps 36 may also be obscured, e.g., in the case of NIR lamps located near the sensor 34. The computer 40 may determine, e.g., according to known image-analysis techniques, that a set of pixels in image data received from the sensor 34 is unchanging over time compared to the other of the pixels in the image data, suggesting that a portion of the field of view of the sensor 34 has been covered. For another example, the computer 40 may determine whether a decrease in average intensity in images from the sensor 34 is greater than a threshold over a time period. The threshold and the time period can be chosen to indicate that an obstruction has occurred and not a change from, e.g., sunny to cloudy. For another example, the computer 40 may receive a weather forecast or an instruction based on a weather forecast from, e.g., the vehicle computer 72. The weather forecast can be a weather type likely to obstruct the lamps 36, e.g., rain or snow. Alternatively or additionally, the trigger can indicate an opportunity for evaluating the lamps 36, i.e., that evaluating the lamps 36 will not interfere with other operations of the vehicle 30. For example, the computer 40 may determine that a minimum time period or mileage has elapsed since the lamps 36 were last evaluated and that the vehicle 30 is at a stoplight or stopped in traffic and will continue to be stopped for at least enough time to complete the rest of the process 500. The minimum time period or mileage may be chosen based on experiments determining how frequently the lamps 36 become obstructed. If the trigger has not occurred, the process 500 returns to the block 505 to continue monitoring for the trigger. If the trigger has occurred, the process 500 proceeds to a block 515.

In the block 515, the computer 40 sequentially activates the lamps 36. The computer 40 activates one lamp 36 or a subset of lamps 36 while the rest of the lamps 36 are deactivated, then deactivates that lamp 36 or subset of lamps 36 and activates a different lamp 36 or subset of lamps 36, and repeats until all the lamps 36 have been activated once. The number of activations is from two to the total number of lamps 36.

Next, in a block 520, the computer 40 receives data generated by the sensors 34 during the activations of the lamps 36. The data includes at least one image captured during each activation of one or a subset of lamps 36. The image data can include a body panel 44, 46, 48 in the field of view of the sensor 34, e.g., the roof 46 or the hood 48 if the sensor 34 is mounted in the roof 46 of the vehicle 30.

Next, in a block 525, the computer 40 receives data from the sensors 34 providing a three-dimensional map of the external environment through the communications network 74. For example, the data may be generated through sensor fusion of data from LIDAR and/or radar sensors. In the case of, e.g., NIR lamps positioned around one of the sensors 34, the data may be generated by other of the sensors 34.

Next, in a block 530, the computer 40 determines positions of ambient light sources from the data from the sensor 34 during the sequential activations of the lamps 36, e.g., the data of the body panel 44, 46, 48 in the field of view. The position of an ambient light source can be represented as a spatial vector defining a direction of light from the ambient light source that is located infinitely far away. For example, the computer 40 may solve for the positions of ambient light sources reflected off of the body panel 44, 46, 48 based on the known geometry of the body panel 44, 46, 48. The geometry may be stored in the memory of the computer 40 as a map of surface normals, e.g., as a unit vector stored for each pixel in the field of view of one of the sensors 34, in which each unit vector is oriented normal, i.e., orthogonal, to the surface. The computer 40 can identify the reflected ambient light sources by finding bright patches, i.e., localized regions with intensities above a threshold chosen based on corresponding to light sources, in the data of the body panel 44, 46, 48, and then checking which bright patches remain during all activations of the lamps 36, i.e., are reflected off the body panel 44, 46, 48 regardless of which lamps 36 are activated. The computer 40 determines an angle at the bright patch between the surface normal at that bright patch and a vector aimed at the sensor 34, and the computer 40 then determines a vector from the bright patch at that angle away from the sensor, and the ambient light source is located on that vector.

Next, in a block 535, the computer 40 determines a map of surface normals based on the positions of the ambient light sources and based on the data generated by the sensor 34 during the sequential activations of the lamps 36. A map of surface normals is a map of vectors normal to a surface of an object viewed by the sensors 34, e.g., the surface of the body panel 44, 46, 48 or of an object in the environment. Each vector is a three-dimensional spatial vector normal, i.e., orthogonal or perpendicular, to a small portion of a surface of an object in the environment, and the vectors thereby define the orientation of the surfaces. The vectors may be unit vectors that are unitless. The vectors are mapped to a position in an image of the field of view of one of the sensors 34. The computer 40 uses photometric stereo techniques to generate the map of surface normals, as is known. Photometric-stereo techniques require images of the object under different lighting conditions. The different lighting conditions are supplied by the sequential activations of the lamps 36 from different positions.

Next, in a block 540, the computer 40 determines respective intensities for the lamps 36 based on the data generated by the sensor 34 during the sequential activations of the lamps 36, e.g., including based on the positions of the ambient light sources and on the surface normals. For example, the computer 40 uses photometric stereo techniques to extrapolate the intensities of the lamps 36 from the surface normals and from the intensities of those surfaces in images in which particular lamps 36 are on or off.

Alternatively for the blocks 530, 535, and 540, the computer 40 can determine the respective intensities for the lamps 36 by using a convolutional neural network. The inputs to the convolutional neural network are the data generated by the sensors 34 during the sequential activations of the lamps 36. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. As intermediate or further steps in identifying the type of obstruction, the computer 40 can generate and then use the positions of the ambient light sources and the map of surface normals, as described above. For example, the positions of the ambient light sources and/or the map of surface normals can be layers in the convolutional neural network.

Next, in a decision block 545, the computer 40 determines whether any of the intensities of the lamps 36 are below a respective threshold for that lamp 36. A threshold for intensity can be chosen for each of the lamps 36 based on a full intensity for that lamp 36 and on a percentage of the full intensity below which a resolution of the sensors 34 falls below a minimum resolution for operating the vehicle 30 with a given accuracy. If none of the lamps 36 are below the respective intensity threshold, the process 500 ends. If at least one lamp 36 is below the respective intensity threshold, the process 500 proceeds to a decision block 550.

The block 550 is executed after the decision block 545 if at least one lamp 36 is below the respective intensity threshold, or the block 550 is executed after a block 555. In the block 550, the computer 40 determines whether a current situation, i.e., location and/or status of operation, of the vehicle 30 is conducive to cleaning the lamps 36. For example, the computer 40 determines whether the vehicle 30 is at a stoplight or stopped in traffic and will continue to be stopped for at least enough time to complete the cleaning step. If the situation of the vehicle 30 is not conducive to cleaning, the process 500 proceeds to the block 555. If the situation of the vehicle 30 is conducive to cleaning, the process 500 proceeds to a block 560.

In the block 555, the computer 40 actuates the power supplies 76 of the lamps 36 that have intensities below their respective intensity thresholds to increase the voltage to those lamps 36. The increase in voltage can be achieved by a constant increase or a change to pulse-width-modulation (PWM) parameters governing the electrical supply. The quantity by which the voltage is increased to a lamp 36 may be chosen to counteract the decrease in intensity, e.g., if the intensity of the lamp 36 is 75% of the default intensity, then the power supply 76 can supply a voltage of 133% of the typical voltage, so the intensity is approximately $0.75 \times 1.33 \times I_{default} = I_{default}$, in which $I_{default}$ is the default intensity of the lamp 36 in, e.g., lumens. After the block 555, the process 500 returns to the decision block 550 to continue monitoring whether the situation of the vehicle 30 is conducive to cleaning the lamps 36.

After the decision block 550, if the situation of the vehicle 30 is conducive to cleaning, the block 560 is executed. In the block 560, the computer 40 actuates the power supplies of the lamps 36 to set the voltage to those lamps at the typical voltage.

Next, in a block 565, the computer 40 actuates the liquid cleaning system 52 and/or the air cleaning system 54 to clean the lamps 36 that have intensities below the respective intensity thresholds. The computer 40 may select a cleaning level, e.g., a pressure of the washer fluid or the air, based on the decrease in intensity. For example, the computer 40 can instruct the liquid cleaning system 52 to eject washer fluid at a higher pressure for an intensity of 50% of the full intensity of the lamp 36 than for an intensity of 75% of the full intensity of the lamp 36. The computer 40 may select a pressure of washer fluid as a mathematical formula of the decrease in intensity, e.g., P=−kΔI, in which P is the pressure of the washer fluid, k is a constant, and ΔI is the change in intensity. After the block 560, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   sequentially activate a plurality of lamps fixed relative to each other;
   determine that an intensity for at least one of the lamps is below a respective intensity threshold based on data from a sensor during the sequential activations of the lamps;
   in response to one of the intensities being below the respective intensity threshold, increase a voltage to each lamp having an intensity below the respective intensity threshold by an amount proportional to a difference between the respective intensity threshold and the respective intensity; and
   in response to one of the intensities being below the respective intensity threshold, actuate at least one cleaning system to clean the lamps that have intensities below the respective intensity thresholds.

2. The computer of claim 1, wherein the instructions further include to determine surface normals from the data from the sensor during the sequential activations of the lamps, and determine the respective intensities for the lamps based on the surface normals and on the data from the sensor during the sequential activations of the lamps.

3. The computer of claim 1, wherein the instructions further include to determine positions of ambient light sources from the data from the sensor during the sequential activations of the lamps, and determine the respective intensities for the lamps based on the positions of the ambient light sources and on the data from the sensor during the sequential activations of the lamps.

4. The computer of claim 3, wherein the sensor data includes data of a body panel during each activation of one of the lamps, and determining positions of ambient light sources is based on the data of the body panel.

5. The computer of claim 1, wherein the instructions further include to, in response to one of the intensities being below the respective intensity threshold, select a pressure for the at least one cleaning system based on a difference between the respective intensity threshold and the respective intensity, and then actuate the at least one cleaning system at the selected pressure to clean the respective lamp.

6. The computer of claim 1, wherein the instructions further include to, in response to one of the intensities being below the respective intensity threshold after increasing the voltage, decrease the voltage by the amount increased.

7. A computer comprising a processor and a memory storing instructions executable by the processor to:
   sequentially activate a plurality of lamps fixed relative to each other;
   determine that an intensity for at least one of the lamps is below a respective intensity threshold based on data from a sensor during the sequential activations of the lamps;
   in response to one of the intensities being below the respective intensity threshold, increase a voltage to each lamp having an intensity below the respective intensity threshold by an amount proportional to a difference between the respective intensity threshold and the respective intensity;
   determine positions of ambient light sources from the data from the sensor during the sequential activations of the lamps; and
   determine the respective intensities for the lamps based on the positions of the ambient light sources and on the data from the sensor during the sequential activations of the lamps;
   wherein the sensor data includes data of a body panel during each activation of one of the lamps, and determining positions of ambient light sources is based on the data of the body panel.

8. The computer of claim 7, wherein the instructions further include to, in response to one of the intensities being below the respective intensity threshold, actuate at least one cleaning system to clean the lamps that have intensities below the respective intensity thresholds.

9. The computer of claim 7, wherein the instructions further include to determine surface normals from the data from the sensor during the sequential activations of the lamps, and determine the respective intensities for the lamps based on the surface normals and on the data from the sensor during the sequential activations of the lamps.

10. The computer of claim 7, wherein the instructions further include to, in response to one of the intensities being below the respective intensity threshold after increasing the voltage, actuate at least one cleaning system to clean the lamps that have intensities below the respective intensity thresholds.

11. The computer of claim 10, wherein the instructions further include to, in response to one of the intensities being below the respective intensity threshold, select a pressure for the at least one cleaning system based on a difference between the respective intensity threshold and the respective intensity, and then actuate the at least one cleaning system at the selected pressure to clean the respective lamp.

12. The computer of claim 10, wherein the instructions further include to, in response to one of the intensities being below the respective intensity threshold after increasing the voltage, decrease the voltage by the amount increased.

13. A computer comprising a processor and a memory storing instructions executable by the processor to:
   sequentially activate a plurality of lamps fixed relative to each other;
   determine that an intensity for at least one of the lamps is below a respective intensity threshold based on data from a sensor during the sequential activations of the lamps;
   in response to one of the intensities being below the respective intensity threshold, increase a voltage to each lamp having an intensity below the respective intensity threshold by an amount proportional to a difference between the respective intensity threshold and the respective intensity; and
   in response to one of the intensities being below the respective intensity threshold after increasing the voltage, actuate at least one cleaning system to clean the lamps that have intensities below the respective intensity thresholds.

14. The computer of claim 13, wherein the instructions further include to, in response to one of the intensities being below the respective intensity threshold, actuate at least one cleaning system to clean the lamps that have intensities below the respective intensity thresholds.

15. The computer of claim 13, wherein the instructions further include to determine surface normals from the data from the sensor during the sequential activations of the lamps, and determine the respective intensities for the lamps based on the surface normals and on the data from the sensor during the sequential activations of the lamps.

16. The computer of claim 13, wherein the instructions further include to determine positions of ambient light sources from the data from the sensor during the sequential activations of the lamps, and determine the respective intensities for the lamps based on the positions of the ambient light sources and on the data from the sensor during the sequential activations of the lamps.

17. The computer of claim 16, wherein the sensor data includes data of a body panel during each activation of one of the lamps, and determining positions of ambient light sources is based on the data of the body panel.

18. The computer of claim 13, wherein the instructions further include to, in response to one of the intensities being below the respective intensity threshold, select a pressure for the at least one cleaning system based on a difference between the respective intensity threshold and the respective intensity, and then actuate the at least one cleaning system at the selected pressure to clean the respective lamp.

19. The computer of claim 13, wherein the instructions further include to, in response to one of the intensities being below the respective intensity threshold after increasing the voltage, decrease the voltage by the amount increased.

* * * * *